United States Patent
Sibbach et al.

(10) Patent No.: US 12,435,644 B1
(45) Date of Patent: Oct. 7, 2025

(54) GAS TURBINE ENGINES WITH INLET GUIDE VANES

(71) Applicants: General Electric Company, Evendale, OH (US); General Electric Company Polska sp. z o.o., Warsaw (PL)

(72) Inventors: Arthur W. Sibbach, Boxford, MA (US); Marcin Jacek Łobocki, Warsaw (PL); Tomasz Jan Bulsiewicz, Warsaw (PL); Marcin Krzysztof Wachulec, Warsaw (PL); Jeffrey D. Clements, Evendale, OH (US)

(73) Assignees: General Electric Company, Evendale, OH (US); General Electric Company Polska sp. z o.o., Warsaw (PL)

( * ) Notice: Subject to any disclaimer, the term of this patent is extended or adjusted under 35 U.S.C. 154(b) by 0 days.

(21) Appl. No.: 18/990,445

(22) Filed: Dec. 20, 2024

(51) Int. Cl.
  *F01D 25/02* (2006.01)
  *F01D 9/04* (2006.01)
  *F01D 17/16* (2006.01)

(52) U.S. Cl.
  CPC .............. *F01D 25/02* (2013.01); *F01D 9/041* (2013.01); *F01D 17/162* (2013.01); *F05D 2240/12* (2013.01)

(58) Field of Classification Search
  CPC ................................ F01D 25/02; F01D 17/162
  See application file for complete search history.

(56) References Cited

U.S. PATENT DOCUMENTS

| | | | | |
|---|---|---|---|---|
| 2,540,472 A * | 2/1951 | Boyd | .................. | F01D 5/18 415/121.2 |
| 2,927,725 A * | 3/1960 | Rainbow | .................. | F02C 7/047 415/115 |
| 3,861,822 A * | 1/1975 | Wanger | .................. | F04D 29/563 415/162 |
| 4,193,738 A * | 3/1980 | Landis, Jr. | ............ | F01D 17/162 277/927 |
| 4,579,507 A * | 4/1986 | Corrigan | ............... | F01D 17/162 415/150 |
| 4,883,404 A * | 11/1989 | Sherman | ................. | F01D 5/187 29/889.721 |
| 5,029,440 A * | 7/1991 | Graber | .................... | F02C 7/047 244/134 B |
| 5,184,459 A * | 2/1993 | McAndrews | ......... | F01D 17/162 60/226.3 |
| 5,281,091 A * | 1/1994 | Dooley | .................... | F02C 7/047 415/114 |
| 6,292,763 B1 * | 9/2001 | Dunbar | .................... | F02K 3/075 703/7 |

(Continued)

FOREIGN PATENT DOCUMENTS

| DE | 920614 C | * | 11/1954 |
|---|---|---|---|
| EP | 2990335 B1 | | 11/2018 |
| FR | 3114610 A1 | * | 4/2022 |

OTHER PUBLICATIONS

Ruscovici et al (Smart Actuation of Inlet Guide Vanes for Small Turbine Engine ) (Year: 2014).*

*Primary Examiner* — Brian Christopher Delrue
(74) *Attorney, Agent, or Firm* — Hanley, Flight & Zimmerman, LLC

(57) ABSTRACT

Gas turbine engines with inlet guide vanes are described herein. The inlet guide vanes have throat solidity (TS), variable throat solidity (VTS), and span throat solidity (STS) values within particular ranges.

20 Claims, 8 Drawing Sheets

(56) References Cited

U.S. PATENT DOCUMENTS

| | | | |
|---|---|---|---|
| 6,485,255 B1* | 11/2002 | Care | F01D 25/12 |
| | | | 415/12 |
| 6,722,119 B2 | 4/2004 | Boeck | |
| 7,055,304 B2 | 6/2006 | Courtot et al. | |
| 7,374,403 B2 | 5/2008 | Decker et al. | |
| 9,874,109 B2 | 1/2018 | Hatcher, Jr. et al. | |
| 10,113,444 B2* | 10/2018 | Huang | F01D 9/065 |
| 10,458,426 B2 | 10/2019 | Wilkin et al. | |
| 10,598,191 B2* | 3/2020 | Scholtes | F04D 29/544 |
| 10,605,202 B2* | 3/2020 | Gallagher | F02K 1/06 |
| 10,822,999 B2 | 11/2020 | Morris et al. | |
| 11,053,848 B2 | 7/2021 | Kray et al. | |
| 11,300,136 B2 | 4/2022 | Wilkin, II et al. | |
| 11,434,765 B2 | 9/2022 | Sozio et al. | |
| 11,655,768 B2 | 5/2023 | Sibbach et al. | |
| 11,668,202 B2* | 6/2023 | Anderson | F01D 9/065 |
| | | | 415/115 |
| 11,698,024 B1* | 7/2023 | Menheere | F01D 9/065 |
| | | | 415/1 |
| 11,739,689 B2* | 8/2023 | Sibbach | F02C 7/14 |
| | | | 60/39.093 |
| 11,808,281 B2* | 11/2023 | Miller | F04D 19/002 |
| 2005/0106010 A1* | 5/2005 | Evans | F01D 17/162 |
| | | | 415/160 |
| 2010/0326041 A1* | 12/2010 | Edmondson | F02C 7/047 |
| | | | 415/114 |
| 2010/0329836 A1* | 12/2010 | Edmondson | F02C 7/047 |
| | | | 415/177 |
| 2017/0328379 A1* | 11/2017 | Scholtes | F04D 29/582 |
| 2018/0045116 A1* | 2/2018 | Schenk | F02C 3/04 |
| 2018/0216527 A1* | 8/2018 | D'Angelo | F02C 3/04 |
| 2020/0024980 A1 | 1/2020 | Rose et al. | |
| 2022/0170381 A1* | 6/2022 | Poick | F01D 9/041 |
| 2022/0251967 A1* | 8/2022 | Ivakitch | F16C 33/06 |
| 2023/0053554 A1* | 2/2023 | Sibbach | F04D 29/684 |
| 2023/0054983 A1* | 2/2023 | Rémy | F01D 17/02 |
| 2023/0332511 A1* | 10/2023 | Remy | F01D 21/003 |
| 2024/0052754 A1* | 2/2024 | Nichols | F01D 7/00 |
| 2024/0247593 A1* | 7/2024 | Oldach | F01D 9/041 |
| 2024/0318577 A1* | 9/2024 | Olczak | F02C 7/04 |
| 2024/0369073 A1* | 11/2024 | Olczak | F04D 29/542 |
| 2025/0012202 A1* | 1/2025 | Engebretsen | F01D 25/02 |
| 2025/0027416 A1* | 1/2025 | Massaro | F01D 17/162 |

* cited by examiner

GAS TURBINE ENGINES WITH INLET GUIDE VANES

TECHNICAL FIELD

The present subject matter relates generally to gas turbine engines and, more specifically, to gas turbine engines with inlet guides vanes.

BACKGROUND

An aircraft engine (e.g., a turbofan engine, a turboprop engine, etc.) typically includes a propeller/fan and a gas turbine (sometimes referred to as an engine core) to drive the propeller/fan to produce thrust. The gas turbine engine includes one or more compressor(s), a combustor, and one or more turbine(s) in a serial flow arrangement. The compressor(s) may include one or more stages of rotor blades and stator vanes. Some gas turbine engines include inlet guide vanes (IGVs) upstream of the first stage of compressor rotor blades. The IGVs are angled relative to the axial direction, which causes the air to swirl into the first stage of compressor rotor blades.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
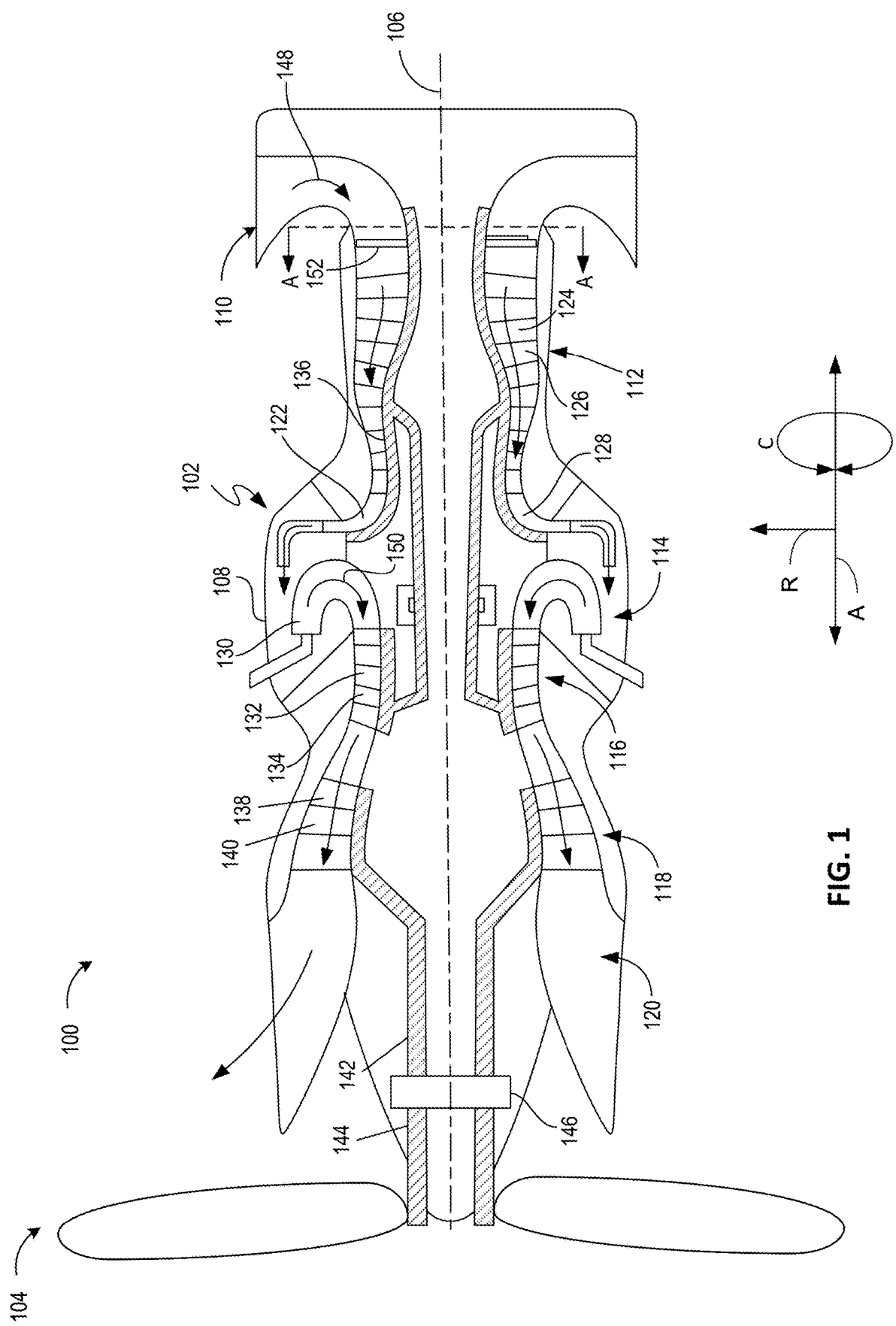
FIG. 1 is a schematic cross-sectional view of an example gas turbine engine in which the examples disclosed herein can be implemented.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Turboprop engines are typically used on aircraft. A turboprop engine is type of gas turbine engine that includes a propeller and a gas turbine (sometimes referred to as turbomachinery or a core) that drives the propeller to produce thrust. The gas turbine includes one or more compressor sections, a combustion section, and one or more turbine sections. The compressor sections have one or more stages of rotor blades and stator vanes arranged in an alternating sequence in the axial direction. The rotor blades are rotated at a relatively high speed to progressively increase the pressure of the incoming airflow to the combustor.

Disclosed herein are example turboprop gas turbine engines that have a coaxial propeller and gas turbine arrangement and that include inlet guide vanes (IGVs) immediately upstream of the first stage of rotor blades of the compressor. Known turboprop gas turbine engines have a propeller and gas turbine that are not coaxial. This requires additional space and complex gearing. The example gas turbine engines disclosed herein have a co-axial propeller and gas turbine arrangement, which creates a more compact, streamline/aerodynamic design, and reduces or eliminates complex gearing between the engine and the propeller. The example coaxial engines disclosed herein also includes IGVs. The IGVs are angled to direct the incoming airflow into the compressor in a swirling (circumferential) direction and increase the pressure ratio of the compressor, which improves engine efficiency and increase power output. In some examples, the gas turbine engine includes fixed pitch IGVs. In other examples, the gas turbine engine includes moveable IGVs, sometimes referred to as variable pitch IGVs. In particular, each IGV is rotatable about its longitudinal or center axis. The IGVs can be rotated between a more closed position, which increases air swirling, and a more open position, in which air flow is more axial. This ability to vary the IGV angle improves engine efficiency and operability at partial loads and/or speeds.

Disclosed herein are IGV designs to be used on turboprop gas turbine engines having a coaxial propeller and turbine engine and that satisfy aerodynamic performance requirements and take into account blade material, heating capacity, and durability requirements. In particular, the IGV designs disclosed herein are durable enough to last a certain number of cycles and also pass the Ice Crystal Icing test. Some examples disclosed herein include heated IGVs. Heated IGVs include internal heating channels that receive heated fluid (e.g., air) to help reduce or limit ice creation on the IGVs. In particular, when an aircraft is operating at higher altitudes, the atmospheric temperature is relatively low (e.g., $-40°$ C.), which may lead to ice formation on the outer surfaces of the IGVs. The formation of ice on the IGVs can negatively affect the aerodynamics of the IGVs as well operability of the actuator systems used to rotate the IGVs between the open and closed positions. Further, ice may occasionally break off of the IGVs and be ingested by the engine, which can negatively affect the operation of the engine (e.g., reduce efficiency, reduce thrust, cause surge, etc.). Therefore, the example IGV designs enable internal channels to receive heated fluid to help reduce or limit such ice creation. The heated fluid is supplied by a pump or other system of the gas turbine engine.

Also, some example IGVs disclosed herein include partially heated IGVs. In particular, the inventors of the present application have determined that, in some examples, only a portion of the IGV needs to be heated to sufficiently reduce or prevent ice creation and pass ice crystal icing tests. Heating only a portion of the IGV, instead of heating the entire IGV, reduces or lessens the amount of heated air supply that is needed by the IGVs, which greatly improves engine efficiency. Further, having heating channels in only a portion of the IGVs enables the design of improved (e.g., thinner, lighter) IGV airfoils.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As may be used herein, the terms "first", "second", "third", "fourth", etc. can be used interchangeably to distinguish one component from another and are not intended to signify location or importance of the individual components.

The terms "forward" and "aft" as may be used herein refer to relative positions within a gas turbine engine and refer to the normal operational attitude or direction of travel of the gas turbine engine. For example, with regard to a gas turbine engine, forward refers to a position relatively closer to the nose of an aircraft and aft refers to a position relatively closer to a tail of the aircraft.

The terms "upstream" and "downstream" refer to a direction with respect to a direction of fluid flow along a flowpath.

The term "fluid" refers to a gas or a liquid.

The singular forms "a", "an", and "the" include plural references unless the context clearly dictates otherwise.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein.

Connection references (e.g., attached, coupled, connected, and joined) are to be construed broadly and can include intermediate structural elements between a collection of elements and relative movement between elements unless otherwise indicated. As such, connection references do not necessarily infer those two elements are directly connected and in fixed relation to one another. The exemplary drawings are for purposes of illustration only and the dimensions, positions, order and relative sizes reflected in the drawings attached hereto can vary.

A rotational axis (denoted A) refers to an axis about which the turbine engine rotates and is aligned with the engine centerline.

A radial axis (denoted R) refers to an axis that extends perpendicular to the rotational axis A and is aligned with a span length of an inlet guide vane.

As used herein, "axial," "axially," or "axial direction" refers to a location or direction with respect to the rotational axis A.

As used herein, "radial," "radially," or "radial direction" refers to a location or direction with respect to the radial axis R.

As used herein, the term "radial distance" refers to a distance measured from the rotational axis A along the radial axis R or parallel to the radial axis R.

As used herein, "circumferential," "circumferentially," or "circumferential direction" refers to an annular dimension circumscribing the rotational axis A.

A chord length (denoted "CL") is a dimension of an airfoil perpendicular to the radial axis R and is a straight-line measurement from a leading-edge of the airfoil to a trailing-edge of the airfoil.

A throat (denoted "T") is a dimension of the shortest or minimum distance between two circumferentially adjacent airfoils, measured at a certain radial distance between the root and the tip. Therefore, the throat may vary along the span length of the airfoil.

As used herein, the throat in the open position (denoted "To"), is the throat as measured between two circumferentially adjacent airfoils when the airfoils are in an open position that is the position in which the airfoils are the most axially aligned with the incoming airflow in their range of positions.

As used herein, the throat in the close position (denoted "Tc"), is the throat as measured between two adjacent airfoils when the airfoils are in a closed position that is the position in which the airfoils are the least axially aligned with the incoming airflow in their range of positions.

A span length (denoted "SL") is a radial dimension of an airfoil that aligns with the radial axis R of a polar or cylindrical system and is measured between a root and a tip of the airfoil.

Referring now to the drawings, FIG. 1 is a schematic cross-sectional view of an example gas turbine engine 100 that can incorporate various examples disclosed herein. The example gas turbine engine 100 can be implemented on an aircraft and therefore referred to as an aircraft engine. In this example, the gas turbine engine 100 is configured as a turboprop engine. However, the principles of the present disclosure are also applicable to other types of engine configurations, such as turbofan and other engines with a nacelle or bypass duct. Further, the example principles disclosed herein can be implemented on other types of engines, such as power-generation engines.

As shown in FIG. 1, the gas turbine engine 100 includes a gas turbine 102 and a propeller 104. The gas turbine 102 can also be referred to as an engine core or turbomachinery. The gas turbine 102 is coupled to (e.g., via a drive shaft) the propeller 104 and drives the propeller 104 to produce thrust. In the illustrated example, the gas turbine engine 100 is configured such that the gas turbine 102 is disposed downstream from the propeller 104. In the illustrated example, the gas turbine engine 100 is configured as a reverse flow engine, with the inlet at the aft end of the gas turbine 102, and the exhaust at the forward end of the gas turbine 102. However, the examples disclosed herein can also be implemented in forward flow engine configurations.

As shown in FIG. 1, the gas turbine engine 100 and/or the gas turbine 102 define a longitudinal or axial centerline axis 106 extending therethrough for reference. FIG. 1 also includes an annotated cylindrical coordinate system with reference to an axial direction A, a radial direction R, and a circumferential direction C. In general, as used herein, the axial direction A is a direction that extends generally parallel to the centerline axis 106, the radial direction R is a direction that extends orthogonally outward from or inward toward the centerline axis 106, and the circumferential direction C is a direction that extends concentrically around the centerline axis 106. Further, as used herein, the term "forward" refers to a direction along the centerline axis 106 in the direction of movement of the gas turbine engine 100, such as to the left in FIG. 1, while the terms "rearward" or "aft" refer to a direction along the centerline axis 106 in the opposite direction, such as to the right in FIG. 1. In the illustrated example, the gas turbine 102 and the propeller 104 are coaxially arranged along the centerline axis 106. Further, as disclosed above, the gas turbine engine 100 is arranged as a reverse flow engine, in which the inlet is at the aft end (right side in FIG. 1) of the gas turbine 102, and the exhaust is at the forward end (left side in FIG. 1) of the gas turbine 102. Using a reverse flow engine configuration with an axial alignment enables a more compact propulsion system compared to a forward flow engine in combination with an offset gearbox for the propeller, because the offset gearbox must be axially separated from the engine inlet in order to provide space for the inlet duct.

The gas turbine 102 includes a substantially tubular outer casing 108 (which may also be referred to as a mid-casing) that defines an annular inlet 110. The outer casing 108 of the gas turbine 102 can be formed from a single casing or multiple casings. The outer casing 108 encloses, in serial flow relationship, a compressor section 112, a combustion section 114, a turbine section having a high pressure turbine 116 ("HP turbine 116") and a low pressure turbine 118 ("LP turbine 118"), and an exhaust section 120. An air flowpath 122 extends from the annular inlet 110 to exhaust section 120 such that compressor section 112, the combustion section 114, the turbines 116, 118, and the exhaust section 120 are in fluid communication.

In the illustrated example, the compressor section 112 includes one or more sequential stages of compressor stator vanes 124, one or more sequential stages of compressor rotor blades 126, and an impeller 128. The combustion section 114 includes a combustor 130. The HP turbine 116 includes one or more sequential stages of turbine stator vanes 132 and one or more sequential stages of turbine rotor blades 134. The gas turbine 102 includes an HP shaft 136 that drivingly couples the HP turbine 116 and the compressor section 112 (and, in particular, the compressor rotor blades 126 and the turbine rotor blades 134). The LP turbine 118 includes one or more sequential stages of turbine stator vanes 138 and one or more sequential stages of turbine rotor blades 140. Additionally, an LP shaft 142 drivingly couples the LP turbine 118 (and, in particular, the turbine rotor blades 140) to an output shaft assembly 144. In the illustrated example, the LP shaft 142 is mechanically coupled to output shaft assembly 144 through a gearbox 146. The propeller 104 is coupled to and driven by the output shaft assembly 144. In some configurations, the compressor section 112 can include multiple compressors coupled to the turbine 116, 118 via separate drive shafts (e.g., in a coaxial or concentric arrangement).

As illustrated in FIG. 1, during operation of the gas turbine engine 100, air 148 enters the annular inlet 110 and is directed through the air flowpath 122 to the compressor section 112 where one or more sequential stages of compressor stator vanes 124 and compressor rotor blades 126 coupled to the HP shaft 136 progressively compress the air 148. The impeller 128 further compresses the air 148 and directs the compressed air 148 into the combustion section 114 where the air 148 mixes with fuel. The combustor 130 combusts the air/fuel mixture to provide combustion gases 150. The combustion gases 150 flow along the air flowpath 122 through the HP turbine 116 where one or more sequential stages of turbine stator vanes 132 and turbine rotor blades 134 coupled to the HP shaft 136 extract energy therefrom. The combustion gases 150 subsequently flow through the LP turbine 118, where an additional amount of energy is extracted through additional stages of turbine stator vanes 138 and turbine rotor blades 140 coupled to LP shaft 142. The energy extraction from HP turbine 116 supports operation of compressor section 112 through the HP shaft 136, and the energy extraction from the LP turbine 118 supports operation of the output shaft assembly 144 through the LP shaft 142. The combustion gases 150 exit air the flowpath 122 of the gas turbine 102 through the exhaust section 120.

In the illustrated example of FIG. 1, the gas turbine 102 includes a set of inlet guide vanes (IGVs) 152 in the air flowpath 122. The IGVs 152 are disposed upstream of the compressor section 112. The IGVs 152 are used to control the airflow to the first stage of rotor blades of the compressor section 112. In particular, the IGVs 152 can be angled to at least partially swirl the air. Adjusting the airflow helps to reduce turbulence as well as increases the compression ratio of the engine 100, which helps to improve engine efficiency and increase output power.

Figure 2:
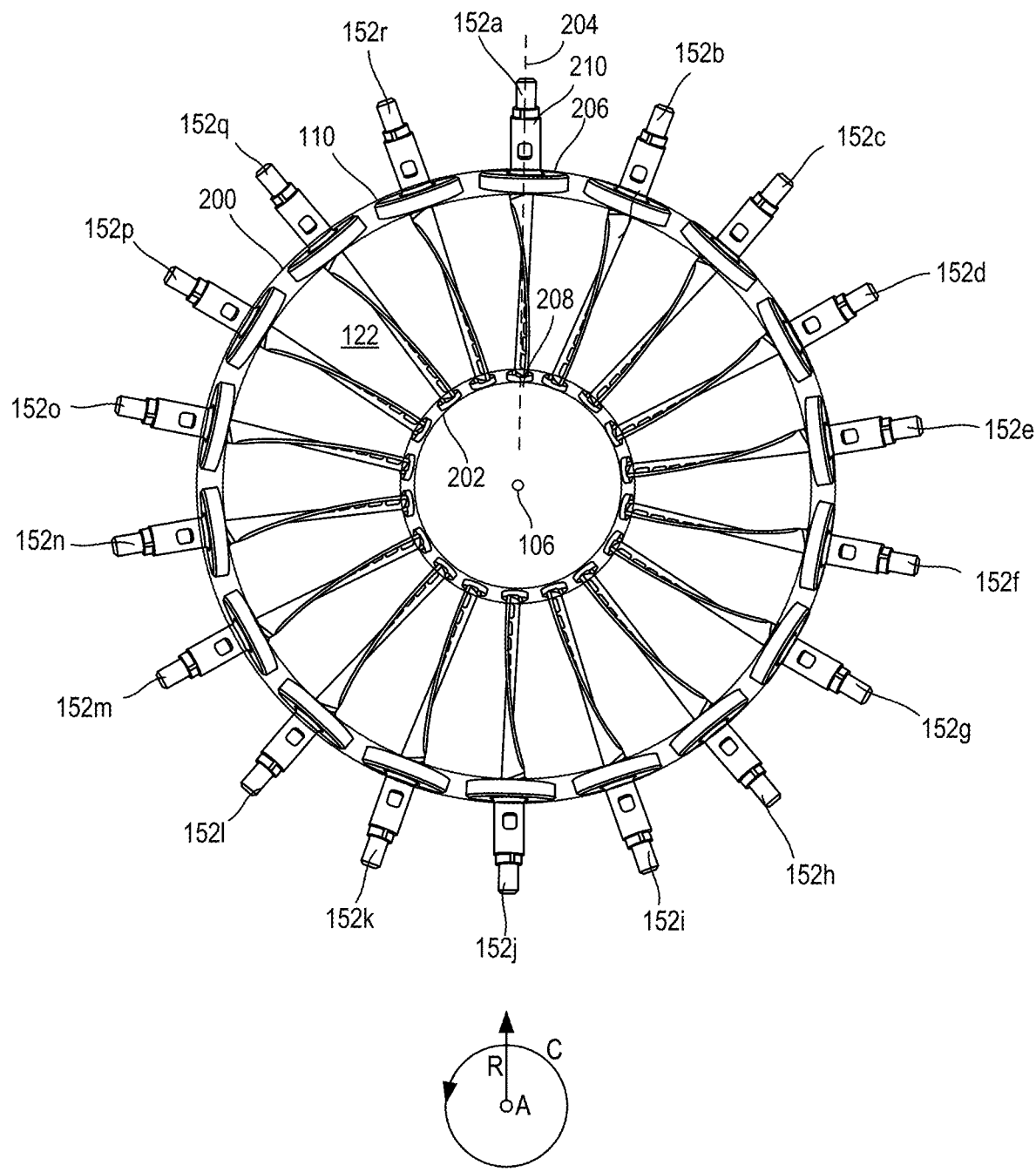
FIG. 2 is an axial view, taken along line A-A of FIG. 1, showing an example set of inlet guide vanes in an airflow path of the gas turbine engine.

FIG. 2 is an axial view taken along line A-A of FIG. 1 showing the plurality of IGVs 152 in the air flowpath 122. In this example, the plurality of IGVs 152 include eighteen (18) IGVs, labeled as 152a-152r. In other examples, the plurality of IGVs 152 can include more or fewer IGVs. In some examples, the plurality of IGVs 152 includes 12-26 IGVs.

In the illustrated example, the casing 108 includes an outer radial wall 200 and an inner radial wall 202. The air flowpath 122 is defined between the outer radial wall 200 and the inner radial wall 202. The IGVs 152 are distributed circumferentially in the air flowpath 122. Each of the IGVs 152 extends through the air flowpath 122 between the outer radial wall 200 and the inner radial wall 202. The IGVs 152 are oriented radially (e.g., in the radial direction R depicted in FIG. 2) relative to the centerline axis 106. The IGVs 152 are used to control the mass flow and generate pre-swirl of the air prior to the first stage rotors of the compressor section 112 (FIG. 1).

Each of the IGVs 152 can be rotated (pitched) about a radial axis extending from the centerline axis 106. For example, the first IGV 152a is rotatable about a radial pitch axis 204. The other IGVs 152b-152r are similarly rotatable about radial pitch axes. The IGVs 152a-152r can be rotated between a first position, referred to herein as an open position, and a second position, referred to herein as a closed position. In the open position, the IGVs 152a-152r are generally aligned with the axial direction and therefore allow the most amount of airflow through the IGVs 152a-152r and to the compressor section 112 (FIG. 1). In the closed position, the IGVs 152a-152r are more angled to swirl the incoming air, and which results in the least amount airflow to the compressor 112. The IGVs 152a-152r can also be rotated to any position between the open and closed positions (e.g., a partially open or closed position). In some examples, the IGVs 152a-152r are rotatable about 60° between the open and closed positions, but in other examples can be designed to rotate more or less. The open and closed positions define the rotational limits of the IGVs 152a-152r.

In the illustrated example, each of the IGVs 152a-152r has an outer trunnion that is disposed in or on the outer radial wall 200 and inner trunnion that is disposed in or on the inner radial wall 202, which enables the IGVs 152a-152r to rotate smoothly relative to the outer and inner radial walls 200, 202. For example, as shown in FIG. 2, the first IGV 152a has an outer trunnion 206 and an inner trunnion 208. Each of the IGVs 152a-152r has a shaft portion. For example, the first IGV 152a has a shaft portion 210. The gas turbine engine 100 may include an actuator that is coupled to the shaft portions, such as by a unison ring, and used to rotate all of the IGVs 152a-152r simultaneously. In some examples, each IGVs 152 may be mounted at both ends, as shown in FIG. 2. However, in other examples, each of the IGVs 152 may be cantilevered. For example, the IGVs 152 may be mounted only at the radially outward end, with the radially inner end being free.

Figure 3:
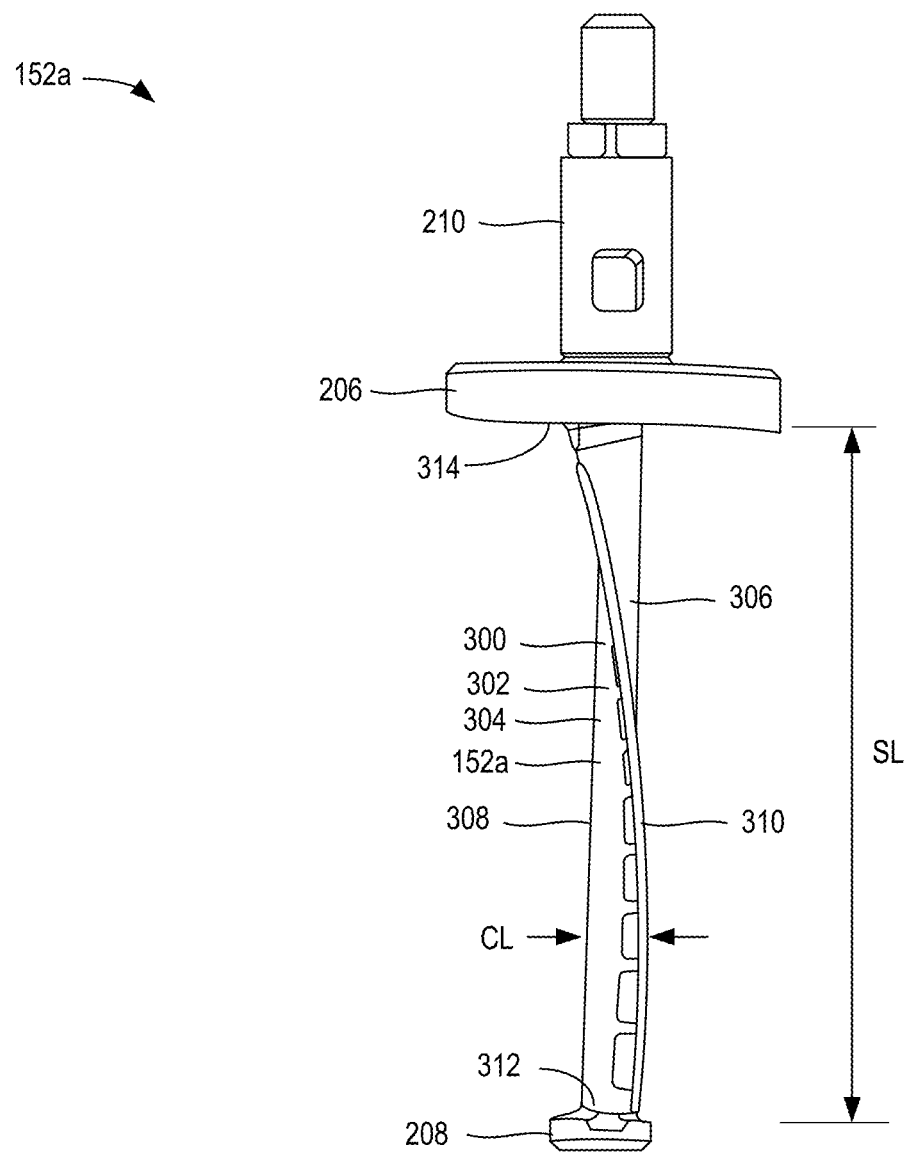
FIG. 3 is a side view of one of the example inlet guide vanes of FIG. 2.
Figure 3:
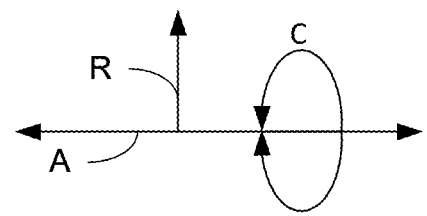

FIG. 3 is a side view of the first IGV 152a. The other IGVs 152b-152r are the same as the first IGV 152a. Thus, any aspects disclosed in connection with the first IGV 152a can likewise apply to the other IGVs 152b-152r.

The first IGV 152a includes an airfoil 300. The airfoil 300 is coupled to and extends between the outer trunnion 206 and the inner trunnion 208. The shaft portion 210 is coupled to an extends radially outward from the outer trunnion 206. In some examples, the first IGV 152a is constructed (e.g., molded, machined, etc.) as a single unitary part or component (e.g., a monolithic structure). In other examples, the first IGV 152a can be constructed as separate parts or components that are coupled together (e.g., via welding).

The airfoil 300 has an exterior surface 302 having a pressure side 304 and a suction side 306, opposite the pressure side 304, and extends between a leading edge 308 and a trailing edge 310, opposite the leading edge 308, and extends between a root 312 and a tip 314, opposite the root 312. The root 312 forms the connection to the inner trunnion 208, and the tip 314 forms the connection to the outer trunnion 206. In other words, the inner radial end of the airfoil 300 forms the root 312 and the outer radial end of the airfoil 300 forms the tip 314. The distance or length in the radial direction R between the root 312 and the tip 314 is defined as the span length (SL). The distance between the leading edge 308 and the trailing edge 310 at a particular radial distance from the centerline axis 106 (FIG. 1) is defined as the chord length (CL). In some examples, the chord length (CL) is different at the root 312 and the tip 314. For example, the chord length (CL) may decrease from the tip 314 to the root 312.

As disclosed herein, the IGVs 152 are rotatable about their respective pitch axes between the open position and the closed position. In the open position, the IGVs 152 are positioned to allow the most or maximum axial airflow, and in the closed position, the IGVs 152 are positioned to allow the least or minimal axial airflow.

Figure 4:
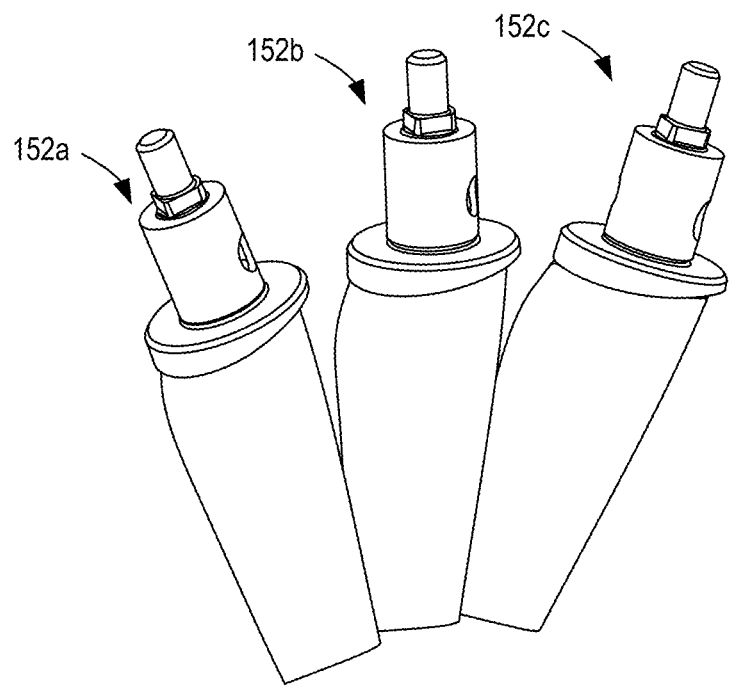
FIG. 4 is a perspective view of three inlet guide vanes of FIG. 2 in a closed position.
Figure 5:
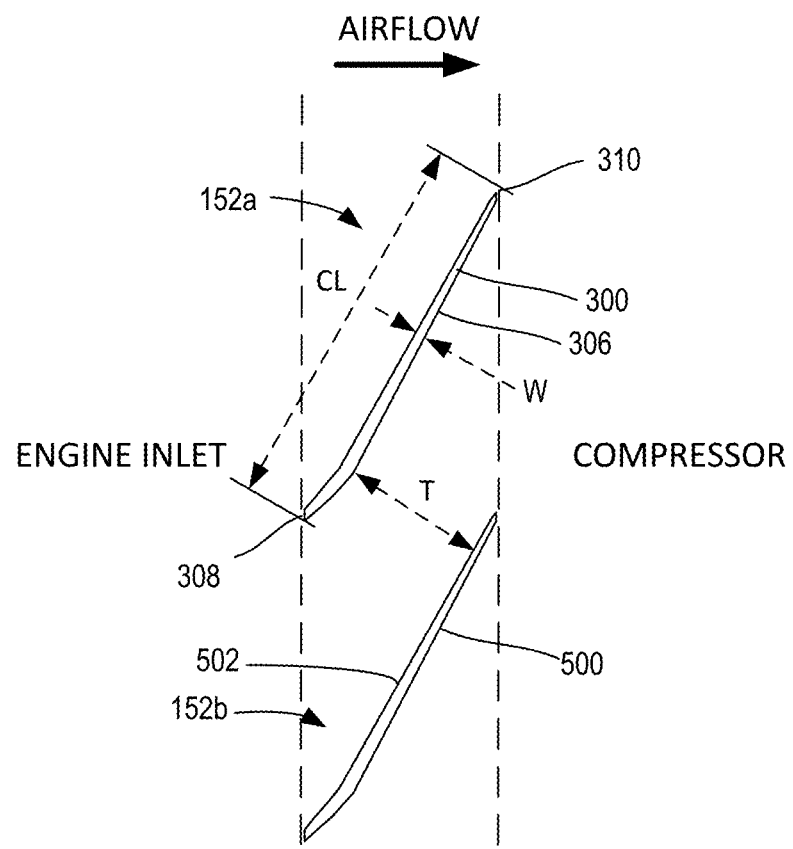
FIG. 5 is a cross-sectional view of two inlet guides vanes of FIG. 4 in the closed position.

FIG. 4 is a perspective view showing three of the IGVs 152a, 152b, 152c in the closed position. FIG. 5 is a cross-sectional view of the airfoils of the first and second IGVs 152a, 152b in the closed position. The first and second IGVs 152a, 152b are adjacent each other. While only two of the IGVs are shown in FIG. 5, it is understood that the two IGVs 152a, 152b can represent any two adjacent IGVs 152a-152r in the set of IGVs 152.

As shown in FIG. 5, the first and second IGVs 152a, 152b are relatively closed or angled relative to the incoming airflow. As such, the first and second IGVs 152a, 152b act to swirl the incoming airflow in the circumferential direction.

As labeled in FIG. 5, the first IGV 152a has a chord length (CL), which is the distance between the leading edge 308 and the trailing edge 310 along a radial plane. A throat (T) is defined as the shortest distance between a first airfoil, such as the airfoil 300 of the first IGV 152, and a second airfoil, such as an airfoil 500 of the second IGV 152b, adjacent the first IGV 152a. The throat (T) is taken on a plane at a certain radial distance. For example, as shown in FIG. 5, which is showing a cross-section at a certain radial distance or span, the throat (T) is the shortest distance between the suction side 306 of the airfoil 300 of the first IGV 152a and a pressure side 502 of the airfoil 500 of the adjacent second IGV 152b. More specifically, the throat (T) is the shortest distance between the suction side 306 of the airfoil 300 and the pressure side 502 of the second airfoil 500 as defined between a first point on the suction side 305 of the airfoil 300 and a second point on the pressure side 502 of the adjacent airfoil 500. Depending on the shape and/or design of the airfoils 300, 500, the first and second points defining the throat (T) can be in different locations along the suction side 306 and the pressure side 502. While one example location of the throat (T) is shown in FIG. 5, it is understood that in other examples the points on the pressure and suction sides 306, 502 defining the throat (T) could be further forward or aft along the pressure and suction sides 306, 502. In some examples, all of the IGVs 152a-152r are spaced equidistant around the centerline axis 106. As such, the throat (T) at a certain radial distance (from the centerline axis 106) is the same between each adjacent pair of the IGVs 152a-152r.

As shown in FIG. 5, the first IGV 152a has a width (W) that is the distance between the pressure side 304 and the suction side 306. The width (W) may change between the leading edge 308 and the trailing edge 310, and between the root 312 and the tip 314.

Figure 6:
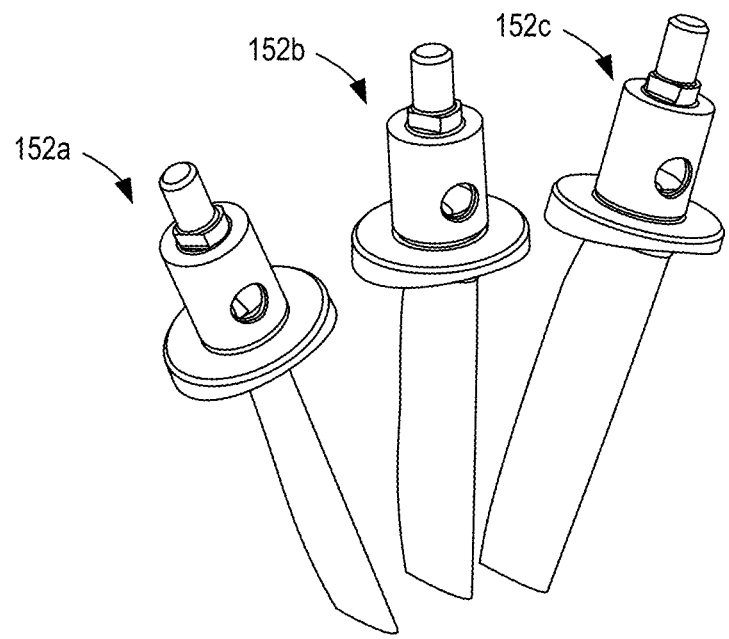
FIG. 6 is a perspective view of three inlet guide vanes of FIG. 2 in an open position.
Figure 7:
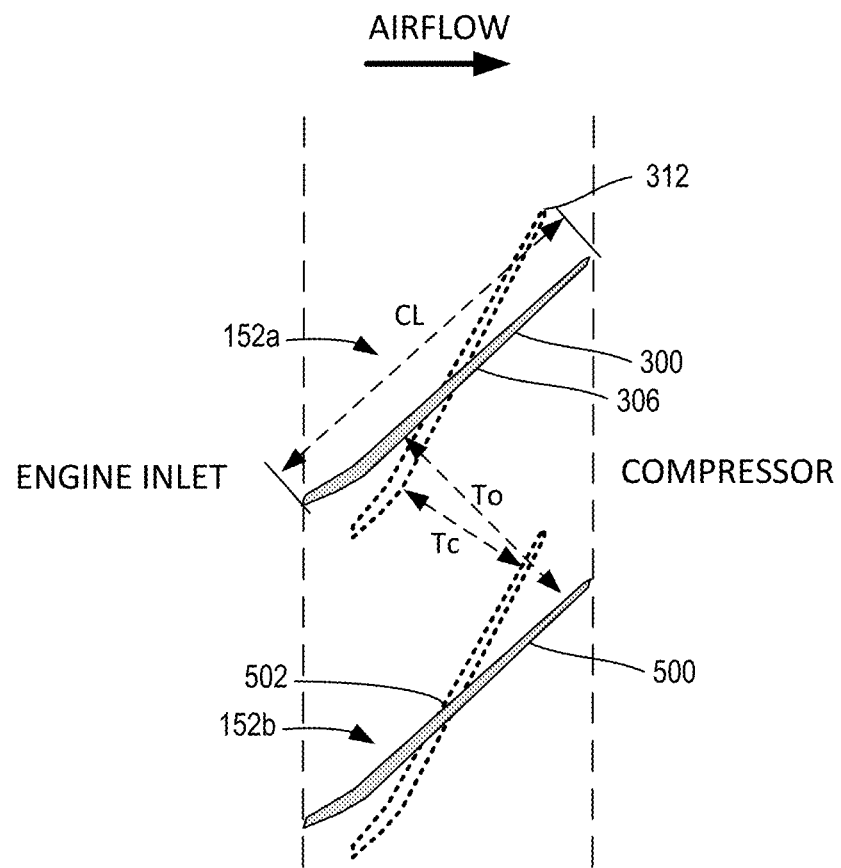
FIG. 7 is a cross-sectional view of two inlet guides vanes of FIG. 6 in the open position, and also showing the inlet guide vanes in the closed position in dotted lines.

FIG. 6 is a perspective view showing the three IGVs 152a, 152b, 152c as rotated to the open position. FIG. 7 is a cross-sectional view of the airfoils of the first and second IGVs 152a, 152b in the open position. The closed position is also shown in FIG. 7. In the open position, the first and second IGVs 152a, 152b are generally aligned with the axial direction and allow the most airflow in the axial direction.

The chord length (CL) is the same whether the IGVs 152a, 152b are in the open position or closed position. However, the throat in the open position, denoted as (To), is larger than the throat in the closed position, denoted as (Tc). In other words, when the IGVs 152a-152r are in the open position, the distance between adjacent ones of the IGVs 152a-152r is generally increased, and when the IGVs 152a-152r are in the closed position, the distance between adjacent ones of the IGVs 152a-152r is generally decreased.

In some examples, the IGVs 152 are at least partially heated. In particular, heated fluid, such as air, is supplied into one or more internal channels in the IGVs 152. The heated fluid warms or increases the temperature of the IGVs 152, which prevents or reduces the creation of ice on the surfaces of the IGVs 152. Ice creation is undesired because ice can break off of the IGVs 152 and be ingested in the engine, as well as negatively affect the airflow along the surfaces of the IGVs 152.

Figure 8A:
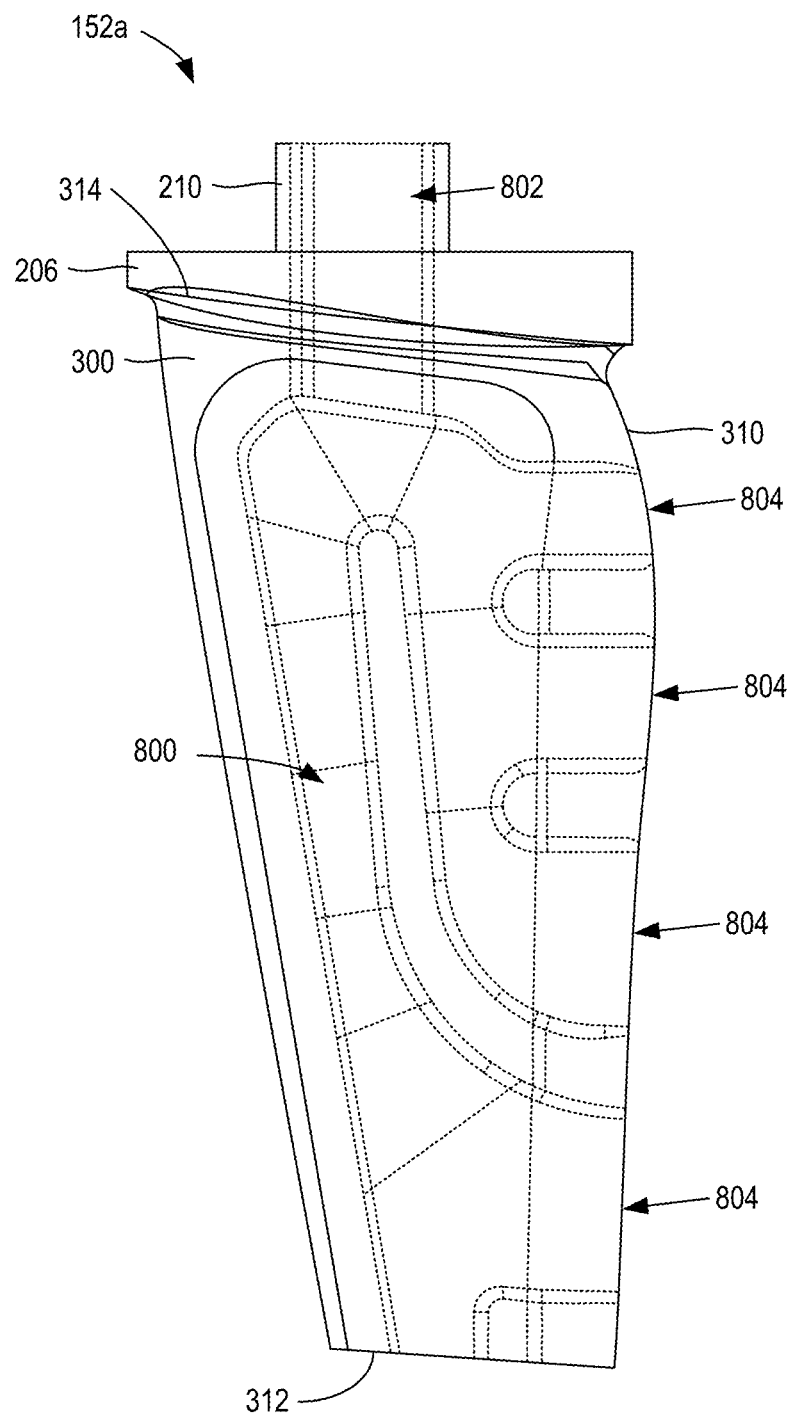
FIG. 8A is a side view of one of the example inlet guide vanes of FIG. 2 with full heating.

FIG. 8A is a side view of the first IGV 152a having an internal heating channel 800 (in dashed lines) formed or defined in the airfoil 300. The first IGV 152a has an internal conduit 802 extending through the shaft portion 210 and the outer trunnion 206 to the internal heating channel 800. Heated fluid is supplied to the internal conduit 802, which routes the heated fluid to the internal heating channel 800 in the airfoil 300. The airfoil 300 has one or more outlets 804 along the trailing edge 310. The fluid flows through the internal heating channel 800 and is exhausted from the outlets 804 at the trailing edge 310. The airfoil 300 can include any number of outlets 804. In this example, the internal heating channel 800 extends entirely between the root 312 and the tip 314. As such, in this example, the first IGV 152a is a fully heated IGV. The other example IGVs 152 may similarly be fully heated.

Figure 8B:
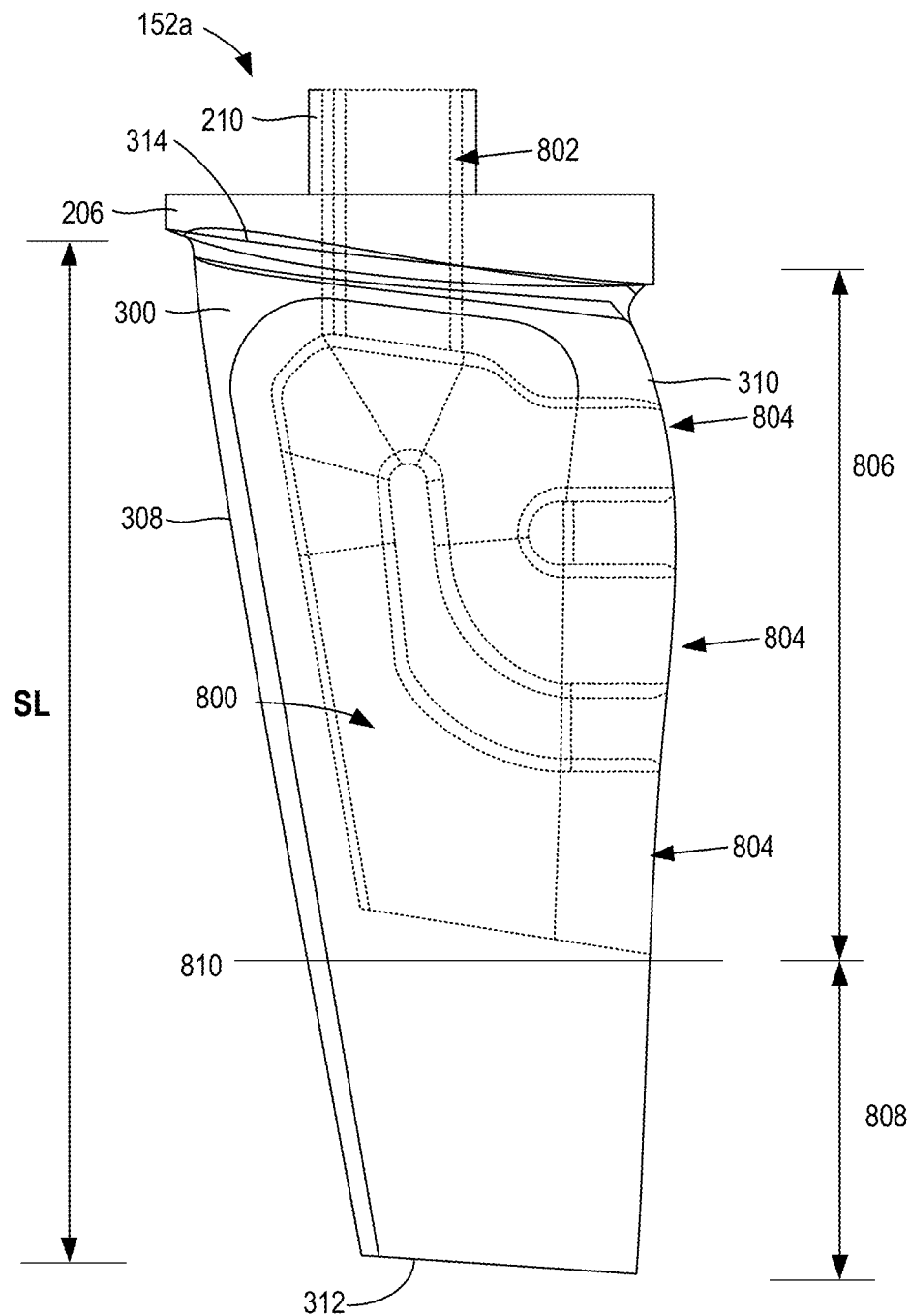
FIG. 8B is a side view of one of the example inlet guide vanes of FIG. 2 with partial heating.

In some examples, the IGVs 152 may be partially heated. The inventors of the present application determined it may be advantageous to heat only a portion of the airfoil 300. This reduces the demand for heated air supply, which increases efficiency of the engine, while still sufficiently preventing or reducing ice creation on the IGVs. For instance, as shown in FIG. 8B, a first portion 806 of the span length (SL) of the airfoil 300 is heated, while a second portion 808 of the span length (SL) of the airfoil 300 is unheated. In other words, the first portion 806 includes the internal heating channel 800, whereas the second portion 808 does not contain any internal heating channels. Therefore, the airfoil 300 is only partially heated. In the illustrated example, the first portion 806 (the heated portion) extends between the tip 314 and a mid-plane 810 (which is between the tip 314 and the root 312), and the second portion 808 (the unheated portion) extends between the mid-plane 810 and the root 312. The mid-plane 810 is a plane at a certain radial distance between the tip 314 and the root 312 that separates the first and second portions 806, 808. In some examples, the second portion 808 (the unheated portion) is 25% to 50% of the span length (SL). As such, the example IGVs 152a-152r are partially heated. Reducing the length of the internal heated channel 800 results in lower heated demands, which improves efficiency of the gas turbine 102, while still enabling the IGVs to sufficiently prevent or reduce ice creation.

Figure 9:
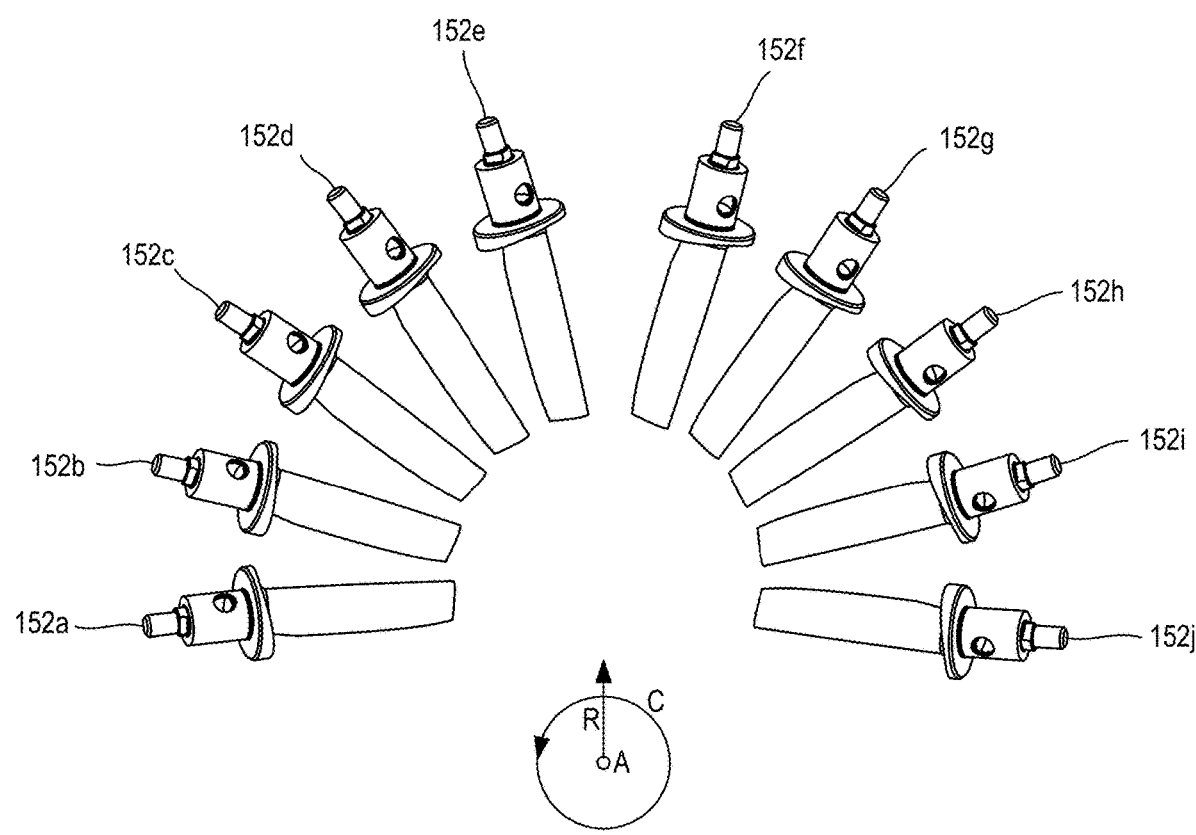
FIG. 9 shows an example of the inlet guide vanes of FIG. 2 having non-uniform spacing.

In some examples, all of the IGVs 152 are uniformly circumferentially spaced. For example, in FIG. 2, all of the IGVs 152 are spaced equidistant to each other in the circumferential direction C. However, in other example, a portion or set of consecutive IGVs 152 may be uniformly spaced, while two or more other IGVs 152 may have non-uniform spacing. For example, as shown in FIG. 9, the IGVs 152a-152e are uniformly spaced, and the IGVs 152f-152j are uniformly spaced, but the arcuate spacing between the fifth IGV 152e and the sixth IGV 152f is larger. In some examples, certain ones of the IGVs 152 are non-uniformly spaced to allow for certain components, such as struts in an engine frame, inlet sensors, and/or other device to extend into the air flowpath 122. Therefore, the throat (T) can vary circumferentially.

In some examples, all of the IGVs 152 are the same or identical. In other examples, the IGVs 152 can include two or more different designs. For instance, in some examples, one or more of the IGVs 152 may be thicker or wider than other ones of the IGVs 152. The thicker IGVs can be used as structural struts, and can also be used to pass tubes, wires, and/or other devices between the radially inner and outer portions of the engine.

Designing IGVs is generally a very labor intensive and time-consuming process that involves careful consideration of the inter-related aerodynamic, thermal, and mechanical factors that influence airfoil performance (e.g., specific fuel consumption impact). IGVs are assessed for durability, ruggedness, and reliability to be able to perform in harsh environments and over a wide range of environmental conditions. Numerous studies are used to evaluate the combined influences of aero performance, thermal, and mechanical strain on an IGV. These studies test durability by subjecting the IGVs to thousands of cycles. The process, in large part, requires the assembly and testing of IGVs in actual and simulated environments in order to get a sufficiently clear and comprehensive understanding of the complex influencing factors producing stress concentrations in a part.

The process of designing IGVs is rigorous and involves the selection of particular dimensions that take into account IGV material, durability, heating capacity, and costs to ensure the IGVs meet certain aerodynamic requirements (e.g., for operating within current engine systems) and testing the IGV designs to ensure the designs pass the Ice Crystal Icing test, which is a Federal Aviation Administration (FAA) requirement under Title 14 Code of Federal Regulations (14 CFR) parts 23, 25, 27, 29, and 33 that regulate airworthiness of the engine. For instance, the IGVs are located at the coldest point in the engine flowpath. Furthermore, IGVs are non-rotating, so they are not subjected to centrifugal forces like the rotor blades of the compressor section. As such, there is generally a greater variety of materials that can be used to construct the IGVs. Some example IGV materials include aluminum alloys, stainless steel, or titanium. Aluminum IGVs may need to be relatively thicker than steel or titanium to meet the durability requirements, but aluminum conducts heat much better than other metals, so a thicker wall does not imply a reduced heat transfer. Durability of an IGV is affected by both the chosen material and the thickness of the material. An IGV can be designed for a life of 5000 hours/cycles or a life of 10,000 hours/cycles, which drives the time between overhauls of the engine. Stainless steel or titanium blades can be made thinner, but are more expensive to produce. On the other hand, steel and titanium are more durable. Further, the IGV design must pass the Ice Crystal Icing test. If too much ice is formed on the IGVs, and the Ice Crystal Icing test is failed, the process is repeated until designs are found with lower ice creation. In light of this design practice, the inventors found solutions for IGVs that meet the aerodynamic requirements (e.g., operating constraints), while satisfying durability requirements and producing relatively low ice creation to pass the Ice Crystal Icing test.

Table 1 below illustrates seven example sets of IGVs from different engine configurations developed by the inventors and which achieved a desired balance among the above-noted factors that influence whether an acceptable IGV design has been found. The Examples are denoted Ex. 1-Ex. 7. The Examples 1-7 have between 12 and 26 IGVs. The Examples 1-7 represent different engine sizes and powers. In some examples, the Examples 1-7 are from engines having 500-2500 horsepower (HP). For each Example there are two rows, one for the tip location and one for the root location. Table 1 has columns for the chord length (CL), the throat in the closed position (Tc), and the throat in the open position (To) for the tip location and the root location. All of the dimensions in Table 1 are in centimeters (cm).

TABLE 1

| Ex. | Loc. | CL | Tc | To |
|---|---|---|---|---|
| Ex. 1 | Tip | 2.621 | 2.035 | 2.888 |
|  | Root | 1.610 | 0.445 | 1.217 |
| Ex. 2 | Tip | 2.560 | 2.035 | 2.888 |
|  | Root | 1.656 | 0.445 | 1.217 |
| Ex. 3 | Tip | 3.759 | 2.934 | 4.140 |
|  | Root | 3.480 | 2.565 | 3.302 |
| Ex. 4 | Tip | 2.560 | 2.035 | 2.888 |
|  | Root | 2.413 | 1.778 | 2.286 |
| Ex. 5 | Tip | 1.829 | 1.524 | 2.032 |
|  | Root | 1.334 | 0.284 | 0.533 |
| Ex. 6 | Tip | 2.560 | 2.035 | 2.286 |
|  | Root | 1.656 | 0.445 | 0.963 |
| Ex. 7 | Tip | 2.159 | 1.969 | 3.302 |
|  | Root | 1.656 | 0.386 | 1.516 |

As developed by the inventors and disclosed herein, the chord length (CL) of the airfoil 300 changes between the root 312 and the tip 314. In general, the chord length (CL) increases from the root 312 toward the tip 314. Therefore, in each of the Examples 1-7, the chord length (CL) at the tip 314 is greater than the chord length (CL) at the root 312. The IGVs 152 may be fully heated (FIG. 8A) or partially heated (FIG. 8B), for example. The chord length (CL) affects the amount of space available for the internal heating channel 800. For example, a larger chord length (CL) results in more space for the internal heating channel 800, but results in more surface space for ice accretion with a given IGV count. Conversely, a smaller chord length (CL) results in less space for the internal heating channel 800, but results in a lighter vane and less surface space for ice accretion with a given IGV count. Further, the size of the internal heating channel 800 is affected by the width (W) of the airfoil 300. With an increase in width (W), the chord length (CL) also needs to be increased to maintain an acceptable aero defined surface velocity distribution. An increase in chord length (CL) requires reduced IGV count to maintain the desired aero loading. A throat area is defined as the cross-sectional area between two circumferentially adjacent airfoils. A total throat area is the sum off all the individual throat areas. Generally, the total throat area is fixed for a given mass flow, which increases the individual throat areas as the IGV count is reduced. This allows the throat solidity (TS), disclosed in further detail below, to remain at the optimum level while increasing the individual IGV heating channel areas. The resulting lower IGV count maintains surface area, but reduces the number of leading edges for ice formation providing for a more robust design. Further, in the partially heated designs, because the IGVs 152 are only heated along the outer radial portions, the width (W) of the airfoils at the tips are larger than the width (W) at the root, which affects the available throat (T) at the tip and the root.

After the making and testing of several embodiments of IGVs, the inventors discovered that there were certain characteristic features that distinguished the successful IGV designs from those that performed less than desired. The embodiments developed by the inventors of the present application, described above and reflected in Table 1, can be characterized according to three relationships or expressions. Each of these embodiments enable at least partially heated airfoils that sufficiently reduce ice creation and pass the Ice Crystal Icing test, while remaining within existing engine constraints. The three expressions, as disclosed in further detail herein, are throat solidity (TS), variable throat solidity (VTS), and span throat solidity (SPS). The expressions are disclosed in further detail below and are described in connection with the first IGV 152a, but it is understood that the expressions can likewise apply to all of the IGVs 152a-152r.

As used herein, the term throat solidity (TS) is defined in Expression (1) as a ratio of the chord length (CL) and the throat (T) as follows:

$$\text{throat solidity } (TS) = \frac{\text{chord length}(CL)}{\text{throat}(T)}. \quad (1)$$

In the throat solidity (TS) expression above, the chord length (CL) and the throat (T) are measured at the same radial distance from the centerline axis 106 (FIG. 1), and it is assumed the airfoil 300 is stationary or held at a constant pitch angle. The throat solidity (TS) represents an amount of restriction (e.g., choking) in the airflow. A higher throat solidity (TS) value indicates higher restriction, whereas a lower throat solidity (TS) value indicates lower restriction. As described above, the chord length (CL) may be different at the root 312 and the tip 314. Further, as described above, the throat (T) is different in the closed position and the open position. In general, when the IGVs 152 are closed, the throat (T) is relatively small, whereas when the IGVs 152 are open, the throat (T) is relatively large. Therefore, a throat solidity (TS) value can be determined at the root 312 and at the tip 314 (and/or any position therebetween), and can be determined in the closed position and in the open position. The throat solidity (TS) values may be different at the root 312 and the tip 314 and in the closed position and the open position.

As used herein, the term variable throat solidity (VTS) is defined as the ratio of the throat solidity (TS) in the closed position (denoted $TS_{closed}$) and the throat solidity (TS) in the open position (denoted $TS_{open}$), which equates to a ratio of the throat in the open position (denoted To) to the throat in the closed position (denoted Tc), as illustrated in FIG. 7. The variable throat solidity (VTS) is defined in Expression (2) as follows:

$$\text{variable throat solidity }(VTS) = \frac{TS_{closed}}{TS_{open}} = \frac{\text{Throat in the open position}(To)}{\text{Throat in the closed position}(Tc)}. \quad (2)$$

In the variable throat solidity (VTS) expression above, it is assumed the chord length (CL) and the throat (T) are measured at the same radial distance, and while the airfoil 300 is held stationary in the closed or open position. The variable throat solidity (VTS) represents the change in throat solidity (TS) between the closed and open positions. The variable throat solidity (VTS) can be determined at the root 312 and the tip 314 (and/or any position therebetween). The variable throat solidity (VTS) values may be different at the root 312 and the tip 314, for example.

As used herein, the term span throat solidity (STS) is defined in Expression (3) as the ratio of the throat solidity (TS) at the root 312 and the throat solidity (TS) at the tip 314 and defined as follows.

$$\text{span throat solidity }(STS) = \frac{\text{throat solidity }(TS)\text{ at the root}}{\text{throat solidity }(TS)\text{ at the tip}}. \quad (3)$$

In the span throat solidity (STS) expression above, it is assumed the chord length (CL) and throat (T) are measured at the same radial distance, and while the airfoil 300 is held stationary. The span throat solidity (STS) represents the change in throat solidity (TS) between the two ends of the airfoil. The span throat solidity (STS) can be determined for the closed position and the open position for an IGV. Therefore, the IGV may have different span throat solidity (STS) values in the closed position and the open position.

Table 2 below shows throat solidity (TS) values, variable throat solidity (VTS) values, and span throat solidity (STS) values for each of the examples Ex. 1-Ex. 7 from Table 1.

TABLE 2

| Ex. | Loc. | CL | Tc | To | Throat Solidity (TS) | | Variable TS (VTS) | Span TS (STS) | |
|---|---|---|---|---|---|---|---|---|---|
| | | | | | $TS_{closed}$ | $TS_{open}$ | VTS | $STS_{closed}$ | $STS_{open}$ |
| Ex. 1 | Tip | 2.621 | 2.035 | 2.888 | 1.288 | 0.908 | 1.419 | 2.812 | 1.458 |
| | Root | 1.610 | 0.445 | 1.217 | 3.623 | 1.324 | 2.737 | | |

TABLE 2-continued

| Ex. | Loc. | CL | Tc | To | Throat Solidity (TS) | | Variable TS (VTS) | Span TS (STS) | |
|---|---|---|---|---|---|---|---|---|---|
| | | | | | $TS_{closed}$ | $TS_{open}$ | VTS | $STS_{closed}$ | $STS_{open}$ |
| Ex. 2 | Tip | 2.560 | 2.035 | 2.888 | 1.258 | 0.887 | 1.419 | 2.961 | 1.535 |
| | Root | 1.656 | 0.445 | 1.217 | 3.726 | 1.361 | 2.737 | | |
| Ex. 3 | Tip | 3.759 | 2.934 | 4.140 | 1.281 | 0.908 | 1.411 | 1.059 | 1.161 |
| | Root | 3.480 | 2.565 | 3.302 | 1.356 | 1.054 | 1.287 | | |
| Ex. 4 | Tip | 2.560 | 2.035 | 2.888 | 1.258 | 0.887 | 1.419 | 1.078 | 1.191 |
| | Root | 2.413 | 1.778 | 2.286 | 1.357 | 1.056 | 1.286 | | |
| Ex. 5 | Tip | 1.829 | 1.524 | 2.032 | 1.200 | 0.900 | 1.333 | 3.906 | 2.778 |
| | Root | 1.334 | 0.284 | 0.533 | 4.688 | 2.500 | 1.875 | | |
| Ex. 6 | Tip | 2.560 | 2.035 | 2.286 | 1.258 | 1.120 | 1.124 | 2.961 | 1.536 |
| | Root | 1.656 | 0.445 | 0.963 | 3.726 | 1.720 | 2.166 | | |
| Ex. 7 | Tip | 2.159 | 1.969 | 3.302 | 1.097 | 0.654 | 1.677 | 3.911 | 1.670 |
| | Root | 1.656 | 0.386 | 1.516 | 4.289 | 1.092 | 3.928 | | |

In Table 2, chord length (CL), throat in the closed position (Tc), and throat in the open position (To) are in centimeters (cm).

As shown above, Table 2 includes throat solidity (TS) values in the closed position (denoted as $TS_{closed}$) and the open position (denoted as $TS_{open}$) at the tip and the root for each Example 1-7. For instance, referring to Example 1, $TS_{closed}$ at the tip is a ratio of the chord length (CL), 2.621, to the throat in the closed position (Tc), 2.035, which equates to 1.288. Similarly, $TS_{open}$ at the tip is a ratio of the chord length (CL), 2.621, to the throat in the open position (To), 2.888, which equates to 0.908. $TS_{closed}$ and $TS_{closed}$ at the root are similarly calculated. The throat solidity (TS) values are unitless.

Table 2 also includes variable throat solidity (VTS) values at the tip and the root for each example IGV. For instance, referring to Example 1, VTS at the tip is a ratio of $TS_{closed}$ at the tip, 1.288, to $TS_{open}$ at the tip, 0.908, which equates to 1.419. VTS at the tip can also be calculated as a ratio of the throat open (To), 2.888, to the throat closed (Tc), 2.035, at the tip. The VTS at the root is similarly calculated as a ratio of $TS_{closed}$ at the root, 3.623, to $TS_{open}$ at the root, 1.324, which equates to 2.737. The variable throat solidity (VTS) values are unitless.

Table 2 also includes span throat solidity (STS) values in the closed position ($STS_{closed}$) and the open position ($STS_{open}$) for each example IGV. For instance, referring to Example 1, $STS_{closed}$ is a ratio of $TS_{closed}$ at the root, 3.623, to $TS_{closed}$ at the tip, 1.288, which equates to 2.812. Similarly, $STS_{open}$ is a ratio of $TS_{open}$ at the root, 1.324, to $TS_{open}$ at the tip, 0.908, which equates to 1.458. The span throat solidity (STS) values are unitless.

Table 3 below includes ranges for the parameters (chord length (CL) and throat (T)) and the expressions (throat solidity (TS), variable throat solidity (VTS), and span throat solidity (SPS)) that result in the improved designs.

TABLE 3

| | min | max | units |
|---|---|---|---|
| CL | 1.25 | 4.1 | cm |
| T | 0.25 | 4.45 | cm |
| TS | 0.5 | 5.0 | unitless |
| VTS | 1.1 | 4.0 | unitless |
| STS | 1.05 | 4.0 | unitless |

The ranges associated with throat solidity (TS), variable throat solidity (VTS), and span throat solidity (STS) identify the airfoil designs of Tables 1 and 2 that pass the Ice Crystal Icing test, are within particular engine constraints (for an engine with a coaxial propeller and turbine engine arrangement), and at the same time do not make sacrifices in terms of strength, weight, aerodynamic performance, and efficiency. In particular, the inventors have found that IGV arrangements and sizes having a throat solidity (TS) value in the range of 0.5 to 5.0, a variable throat solidity (VTS) value in the range of 1.1 to 4.0, and a span throat solidity (STS) value in the range of 1.05 to 5.0 result in airfoil designs that enable at least partial heating and that pass the Ice Crystal Icing test while remaining within current engine constraints for strength, weight, aerodynamic performance and efficiency, as evidenced by the Examples in Table 2. The improved designs increase the life of the IGVs and other engine parts, which decreases required maintenance and costs, while increasing overall engine reliability and time one wing (TOW). Thus, designs having the above-noted throat solidity (TS), variable throat solidity (VTS), and/or span throat solidity (STS) result in such benefits.

IGV arrangements and sizes that have throat solidity (TS), variable throat solidity (VTS), and/or span throat solidity (STS) values outside of the ranges in Table 3 have been found to not meet the aerodynamic performance requirements of the engine 100 and/or have relatively high ice creation that may not pass the Ice Crystal Icing test. High ice creation results in less time on wing (TOW) and greater maintenance costs. Therefore, designs outside of the above-identified ranges do not show the enumerated benefits.

Therefore, the inventors have created IGV designs characterized by previously unrecognized parameters (TS, VTS, STS) and ranges for the parameters (Table 3) that provide successful solutions for engines with a coaxial propeller and turbine engine arrangement and which pass Ice Crystal Icing tests, and which improve engine efficiency. Designs having parameter values falling outside of the ranges of Table 3, have worst performance in engine efficiency or ice accretion.

To the extent one or more structures provided herein can be known in the art, it should be appreciated that the present disclosure can include combinations of structures not previously known to combine, at least for reasons based in part on conflicting benefits versus losses, desired modes of operation, or other forms of teaching away in the art.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

A turbo engine comprising: a propeller; and a gas turbine to drive the propeller to produce thrust, the propeller and the gas turbine being coaxially arranged along a centerline axis, the gas turbine engine having an annular inlet to direct air through an air flowpath to a compressor section of the gas turbine engine, the gas turbine including a set of inlet guide vanes in the air flowpath upstream of the compressor section, wherein each of the inlet guide vanes has an airfoil with an exterior surface having a pressure side and a suction side extending between a leading edge and a trailing edge and extending between a root and a tip, wherein each of the inlet guide vanes has a chord length defined as a distance between the leading edge and the trailing edge, wherein a throat is defined as a shortest distance between a first airfoil of a first inlet guide vane and a second airfoil of a second inlet guide vane adjacent the first inlet guide vane, wherein the chord length and the throat are taken at a same radial distance from the centerline axis, wherein a throat solidity is defined as:

$$\text{throat solidity} = \frac{\text{the chord length}}{\text{the throat}},$$

and wherein the throat solidity is in a range of 0.5 to 5.0.

The gas turbine engine of any preceding clause, wherein a variable throat solidity is defined as:

$$\text{variable throat solidity} = \frac{\text{the throat solidity in the closed position}}{\text{the throat solidity in the open position}},$$

variable throat solidity is in a range of 1.1 to 4.0.

The gas turbine engine of any preceding clause, wherein a span throat solidity is defined as:

$$\text{span throat solidity} = \frac{\text{the throat solidity at the root}}{\text{the throat solidity at the tip}},$$

and wherein the span throat solidity is in the range of 1.05 to 4.0.

The gas turbine engine of claim 1, wherein a variable throat solidity is defined as $$\text{variable throat solidity} = \frac{\text{the throat solidity in the closed position}}{\text{the throat solidity in the open position}},$$

and
wherein the variable throat solidity is in a range of 1.1 to 4.0, wherein a span throat solidity is defined as:

$$\text{span throat solidity} = \frac{\text{the throat solidity at the root}}{\text{the throat solidity at the tip}},$$

and wherein the span throat solidity is in the range of 1.05 to 4.0.

A gas turbine engine comprising: a propeller; and a gas turbine to drive the propeller to produce thrust, the propeller and the gas turbine being coaxially arranged along a centerline axis, the gas turbine engine having an annular inlet to direct air through an air flowpath to a compressor section of the gas turbine engine, the gas turbine including a set of inlet guide vanes in the air flowpath upstream of the compressor section, wherein each of the inlet guide vanes has an airfoil with an exterior surface having a pressure side and a suction side extending between a leading edge and a trailing edge and extending between a root and a tip, wherein each of the inlet guide vanes has a chord length defined as a distance between the leading edge and the trailing edge, wherein a throat is defined as a shortest distance between a first airfoil of a first inlet guide vane and a second airfoil of a second inlet guide vane adjacent the first inlet guide vane, wherein the chord length and the throat are taken at a same radial distance from the centerline axis, wherein a throat solidity is defined as:

$$\text{throat solidity} = \frac{\text{the chord length}}{\text{the throat}},$$

wherein a variable throat solidity is defined as:

$$\text{variable throat solidity} = \frac{\text{the throat solidity in the closed position}}{\text{the throat solidity in the open position}},$$

and wherein the variable throat solidity is in a range of 1.1 to 4.0.

A gas turbine engine comprising: a propeller; and a gas turbine to drive the propeller to produce thrust, the propeller and the gas turbine being coaxially arranged along a centerline axis, the gas turbine engine having an annular inlet to direct air through an air flowpath to a compressor section of the gas turbine engine, the gas turbine including a set of inlet guide vanes in the air flowpath upstream of the compression section, wherein each of the inlet guide vanes has an airfoil with an exterior surface having a pressure side and a suction side extending between a leading edge and a trailing edge and extending between a root and a tip, wherein each of the inlet guide vanes has a chord length defined as a distance between the leading edge and the trailing edge, wherein a throat is defined as a shortest distance between a first airfoil of a first inlet guide vane and a second airfoil of a second inlet guide vane adjacent the first inlet guide vane, wherein the chord length and the throat are taken at a same radial distance from the centerline axis, wherein a throat solidity is defined as:

$$\text{throat solidity} = \frac{\text{the chord length}}{\text{the throat}},$$

wherein a span throat solidity is defined as:

$$\text{span throat solidity} = \frac{\text{the throat solidity at the root}}{\text{the throat solidity at the tip}},$$

and wherein the span throat solidity is in the range of 1.05 to 4.0.

The gas turbine engine of any preceding clause, wherein the airfoil of one or more of the inlet guide vanes is at least partially heated.

The gas turbine engine of any preceding clause, wherein a radial distance between the root and the tip is defined as a span length, and wherein, for each of the airfoils that is at least partially heated, a first portion of the span length of the airfoil has an internal heating channel and a second portion of the span length of the airfoil does not include an internal heating channel.

The gas turbine engine of any preceding clause, wherein, for each of the airfoils, the first portion of the span length of the airfoil extends between the tip and a mid-plane between the root and the tip, and wherein the second portion of the span length of the airfoil extends between the mid-plane and the root.

The gas turbine engine of any preceding clause, wherein the second portion is 25% to 50% of the span length of the airfoil.

The gas turbine engine of any preceding clause, wherein each of the inlet guide vanes is rotatable between an open position and a closed position.

The gas turbine engine of any preceding clause, wherein each of the inlet guide vanes has one or more outlets along the trailing edge.

The gas turbine engine of any preceding clause, wherein the set of inlet guide vanes includes 12-26 inlet guide vanes.

The gas turbine engine of any preceding clause, wherein all the inlet guide vanes are uniformly circumferentially spaced.

The gas turbine engine of any preceding clause, wherein at least two of the inlet guide vanes have non-uniform spacing.

The gas turbine engine of any preceding clause, wherein the chord length at the tip is greater than the chord length at the root.

The gas turbine engine of any preceding clause, wherein the throat solidity decreases from the root to the tip.

The gas turbine engine of any preceding clause, wherein the first inlet guide vane has an outer trunnion, an inner trunnion, and a shaft portion, wherein the first airfoil extends between the outer trunnion and the inner trunnion, and wherein the shaft portion extends radially outward of the outer trunnion.

The gas turbine engine of any preceding clause, wherein the first inlet guide vane has an internal conduit extending through the shaft portion and the outer trunnion to an internal heating channel in the airfoil.

The gas turbine engine of any preceding clause, wherein the chord length is between 1.25 and 4.1 centimeters, and the throat is between 0.25 and 4.45 centimeters.

The gas turbine engine of any preceding clause, wherein the chord length is between 1.32 and 3.76 centimeters, and the throat is between 0.28 and 4.2 centimeters.

The gas turbine engine of any preceding clause, wherein the gas turbine engine is a turboprop engine.

What is claimed is:

1. A gas turbine engine comprising:
   a propeller; and
   a gas turbine to drive the propeller to produce thrust, the propeller and the gas turbine being coaxially arranged along a centerline axis, the gas turbine engine having an annular inlet to direct air through an air flowpath to a compressor section of the gas turbine engine, the gas turbine including a set of inlet guide vanes in the air flowpath upstream of the compressor section,
   wherein each of the inlet guide vanes has an airfoil with an exterior surface having a pressure side and a suction side extending between a leading edge and a trailing edge and extending between a root and a tip,
   wherein each of the inlet guide vanes has a chord length defined as a distance between the leading edge and the trailing edge,
   wherein a throat is defined as a shortest distance between a first airfoil of a first inlet guide vane and a second airfoil of a second inlet guide vane adjacent the first inlet guide vane, wherein the chord length and the throat are taken at a same radial distance from the centerline axis,
   wherein a throat solidity is defined as:

$$\text{throat solidity} = \frac{\text{the chord length}}{\text{the throat}},$$

and
   wherein the throat solidity is in a range of 0.5 to 5.0, and wherein the throat solidity decreases from the root to the tip.

2. The gas turbine engine of claim 1, wherein a variable throat solidity is defined as:

$$\text{variable throat solidity} = \frac{\text{the throat solidity in the closed position}}{\text{the throat solidity in the open position}},$$

wherein the variable throat solidity is in a range of 1.1 to 4.0.

3. The gas turbine engine of claim 1, wherein a span throat solidity is defined as:

$$\text{span throat solidity} = \frac{\text{the throat solidity at the root}}{\text{the throat solidity at the tip}},$$

and wherein the span throat solidity is in the range of 1.05 to 4.0.

4. The gas turbine engine of claim 1, wherein a variable throat solidity is defined as:

$$\text{variable throat solidity} = \frac{\text{the throat solidity in the closed position}}{\text{the throat solidity in the open position}},$$

wherein the variable throat solidity is in a range of 1.1 to 4.0,
   wherein a span throat solidity is defined as:

$$\text{span throat solidity} = \frac{\text{the throat solidity at the root}}{\text{the throat solidity at the tip}},$$

and
   wherein the span throat solidity is in the range of 1.05 to 4.0.

5. The gas turbine engine of claim 1, wherein the airfoil of one or more of the inlet guide vanes is at least partially heated.

6. The gas turbine engine of claim 1, wherein a radial distance between the root and the tip is defined as a span length, and wherein, for each of the airfoils that is at least partially heated, a first portion of the span length of the airfoil has an internal heating channel and a second portion of the span length of the airfoil does not include an internal heating channel.

7. The gas turbine engine of claim 6, wherein, for each of the airfoils, the first portion of the span length of the airfoil extends between the tip and a mid-plane between the root and the tip, and wherein the second portion of the span length of the airfoil extends between the mid-plane and the root.

8. The gas turbine engine of claim 7, wherein the second portion is 25% to 50% of the span length of the airfoil.

9. The gas turbine engine of claim 1, wherein each of the inlet guide vanes is rotatable between an open position and a closed position.

10. The gas turbine engine of claim 1, wherein each of the inlet guide vanes has one or more outlets along the trailing edge.

11. The gas turbine engine of claim 1, wherein the set of inlet guide vanes includes 12-26 inlet guide vanes.

12. The gas turbine engine of claim 1, wherein all the inlet guide vanes are uniformly circumferentially spaced.

13. The gas turbine engine of claim 1, wherein at least two of the inlet guide vanes have non-uniform spacing.

14. The gas turbine engine of claim 1, wherein the chord length at the tip is greater than the chord length at the root.

15. The gas turbine engine of claim 1, wherein the first inlet guide vane has an outer trunnion, an inner trunnion, and a shaft portion, wherein the first airfoil extends between the outer trunnion and the inner trunnion, and wherein the shaft portion extends radially outward of the outer trunnion.

16. The gas turbine engine of claim 15, wherein the first inlet guide vane has an internal conduit extending through the shaft portion and the outer trunnion to an internal heating channel in the airfoil.

17. The gas turbine engine of claim 1, wherein the chord length is between 1.25 and 4.1 centimeters, and the throat is between 0.25 and 4.45 centimeters.

18. The gas turbine engine of claim 1, wherein the gas turbine engine is a turboprop engine.

19. A gas turbine engine comprising:
a propeller; and
a gas turbine to drive the propeller to produce thrust, the propeller and the gas turbine being coaxially arranged along a centerline axis, the gas turbine engine having an annular inlet to direct air through an air flowpath to a compressor section of the gas turbine engine, the gas turbine including a set of inlet guide vanes in the air flowpath upstream of the compressor section,
wherein each of the inlet guide vanes has an airfoil with an exterior surface having a pressure side and a suction side extending between a leading edge and a trailing edge and extending between a root and a tip,
wherein each of the inlet guide vanes has a chord length defined as a distance between the leading edge and the trailing edge,
wherein a throat is defined as a shortest distance between a first airfoil of a first inlet guide vane and a second airfoil of a second inlet guide vane adjacent the first inlet guide vane, wherein the chord length and the throat are taken at a same radial distance from the centerline axis,
wherein a throat solidity is defined as:

$$\text{throat solidity} = \frac{\text{the chord length}}{\text{the throat}},$$

wherein the throat solidity is in a range of 0.5 to 5.0,
wherein a span throat solidity is defined as:

$$\text{span throat solidity} = \frac{\text{the throat solidity at the root}}{\text{the throat solidity at the tip}},$$

and
wherein the span throat solidity is in the range of 1.05 to 4.0.

20. A gas turbine engine comprising:
a propeller; and
a gas turbine to drive the propeller to produce thrust, the propeller and the gas turbine being coaxially arranged along a centerline axis, the gas turbine engine having an annular inlet to direct air through an air flowpath to a compressor section of the gas turbine engine, the gas turbine including a set of inlet guide vanes in the air flowpath upstream of the compressor section,
wherein each of the inlet guide vanes has an airfoil with an exterior surface having a pressure side and a suction side extending between a leading edge and a trailing edge and extending between a root and a tip,
wherein each of the inlet guide vanes has a chord length defined as a distance between the leading edge and the trailing edge,
wherein a throat is defined as a shortest distance between a first airfoil of a first inlet guide vane and a second airfoil of a second inlet guide vane adjacent the first inlet guide vane, wherein the chord length and the throat are taken at a same radial distance from the centerline axis,
wherein a throat solidity is defined as:

$$\text{throat solidity} = \frac{\text{the chord length}}{\text{the throat}},$$

wherein the throat solidity is in a range of 0.5 to 5.0
wherein the airfoil of one or more of the inlet guide vanes is at least partially heated,
wherein a radial distance between the root and the tip is defined as a span length, and wherein, for each of the airfoils that is at least partially heated, a first portion of the span length of the airfoil has an internal heating channel and a second portion of the span length of the airfoil does not include an internal heating channel,
wherein, for each of the airfoils that is at least partially heated, the first portion of the span length of the airfoil extends between the tip and a mid-plane between the root and the tip, and wherein the second portion of the span length of the airfoil extends between the mid-plane and the root, and
wherein the second portion is 25% to 50% of the span length of the airfoil.

* * * * *